US010902044B2

(12) United States Patent
Contreras et al.

(10) Patent No.: US 10,902,044 B2
(45) Date of Patent: Jan. 26, 2021

(54) COGNITIVE DOCUMENT QUALITY DETERMINATION WITH AUTOMATED HEURISTIC GENERATION

(71) Applicant: International Business Machines Corporation, Armonk, NY (US)

(72) Inventors: David Contreras, Willow Spring, NC (US); Aysu Ezen Can, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/179,371

(22) Filed: Nov. 2, 2018

(65) Prior Publication Data

US 2020/0142998 A1 May 7, 2020

(51) Int. Cl.
*G06F 16/93* (2019.01)
*G06F 16/35* (2019.01)
*G06N 5/00* (2006.01)
*G06N 20/00* (2019.01)
*G06F 40/253* (2020.01)

(52) U.S. Cl.
CPC .......... *G06F 16/35* (2019.01); *G06F 40/253* (2020.01); *G06N 5/003* (2013.01); *G06N 20/00* (2019.01)

(58) Field of Classification Search
USPC ........................................ 707/737, E17.079
See application file for complete search history.

(56) References Cited

U.S. PATENT DOCUMENTS

| | | |
|---|---|---|
| 7,200,606 B2 | 4/2007 | Elkan |
| 9,606,990 B2 | 3/2017 | Allen et al. |
| 9,754,076 B2 | 9/2017 | Biegert et al. |
| 9,754,207 B2 | 9/2017 | Allen et al. |
| 9,842,096 B2 | 12/2017 | Beller et al. |
| 2010/0235305 A1* | 9/2010 | Evanitsky .............. G06Q 10/10 706/12 |
| 2015/0324523 A1 | 11/2015 | Parthasarathy et al. |
| 2018/0060304 A1 | 3/2018 | Bull et al. |
| 2018/0081503 A1* | 3/2018 | Green .................. G06N 3/0454 |
| 2019/0251193 A1* | 8/2019 | Singuru ................ G06F 16/215 |

OTHER PUBLICATIONS

Dang et al., "An end-to-end learning solution for assessing the quality of Wikipedia articles," ACM, ISBN 978-1-4503-5187—Apr. 17, 2008, 10 pages.

* cited by examiner

*Primary Examiner* — Baoquoc N To
(74) *Attorney, Agent, or Firm* — Patterson + Sheridan, LLP

(57) ABSTRACT

Techniques for cognitive document quality determination and automated heuristic generation are provided. A plurality of documents is received, where each of the plurality of documents contains natural language text. A plurality of values is determined for a first plurality of predefined attributes of the plurality of documents. A plurality of quality scores is generated for the plurality of documents by processing the plurality of values using a machine learning model, where the plurality of quality scores indicate a suitability of each of the plurality of documents to be processed using a target processing operation. A subset of documents is identified from the plurality of documents having respective quality scores below a predefined threshold. The subset of documents is flagged for further processing. At least one document of the plurality of documents that is not flagged is selectively processed using the target processing operation.

20 Claims, 5 Drawing Sheets

COGNITIVE DOCUMENT QUALITY DETERMINATION WITH AUTOMATED HEURISTIC GENERATION

BACKGROUND

The present disclosure relates to document integration, and more specifically, to determining the quality or suitability of documents for ingestion or processing.

Document integration refers to the process of ingesting documents into a system so that they can be processed. Accurate integration is crucial to the efficacy of the system, because higher quality input yields higher quality output. Additionally, if the integration quality is reduced, the resulting output and efficiency of the system is harmed. However, the range of documents to be ingested or integrated can vary significantly, and the formatting and structure differences between various corpuses prevent the use of any common integration design. Consequently, integration currently requires significant manual effort in order to ensure that the documents from any given corpus are satisfactory before they are ingested. This manual process is slow, expensive, and often inaccurate.

SUMMARY

According to one embodiment of the present disclosure, a method is provided. The method includes receiving a plurality of documents, wherein each of the plurality of documents contains natural language text. A plurality of values is determined for a first plurality of predefined attributes of the plurality of documents. The method also includes generating a plurality of quality scores for the plurality of documents by processing the plurality of values using a machine learning model, wherein the plurality of quality scores indicate a suitability of each of the plurality of documents to be processed using a target processing operation. Additionally, the method includes identifying a subset of documents from the plurality of documents having respective quality scores below a predefined threshold. The subset of documents is flagged for further processing. Finally, the method includes selectively processing, using the target processing operation, at least one document of the plurality of documents that is not flagged.

According to a second embodiment of the present disclosure, a computer program product is provided. The computer program product comprises a computer-readable storage medium having computer-readable program code embodied therewith, the computer-readable program code executable by one or more computer processors to perform an operation. The operation includes receiving a plurality of documents, wherein each of the plurality of documents contains natural language text. A plurality of values is determined for a first plurality of predefined attributes of the plurality of documents. The operation also includes generating a plurality of quality scores for the plurality of documents by processing the plurality of values using a machine learning model, wherein the plurality of quality scores indicate a suitability of each of the plurality of documents to be processed using a target processing operation. Additionally, the operation includes identifying a subset of documents from the plurality of documents having respective quality scores below a predefined threshold. The subset of documents is flagged for further processing. Finally, the operation includes selectively processing, using the target processing operation, at least one document of the plurality of documents that is not flagged.

According to a third embodiment of the present disclosure, a system is provided. The system comprises one or more computer processors, and a memory containing a program which when executed by the one or more computer processors performs an operation. The operation includes receiving a plurality of documents, wherein each of the plurality of documents contains natural language text. A plurality of values is determined for a first plurality of predefined attributes of the plurality of documents. The operation also includes generating a plurality of quality scores for the plurality of documents by processing the plurality of values using a machine learning model, wherein the plurality of quality scores indicate a suitability of each of the plurality of documents to be processed using a target processing operation. Additionally, the operation includes identifying a subset of documents from the plurality of documents having respective quality scores below a predefined threshold. The subset of documents is flagged for further processing. Finally, the operation includes selectively processing, using the target processing operation, at least one document of the plurality of documents that is not flagged.

DETAILED DESCRIPTION

Figure 1:
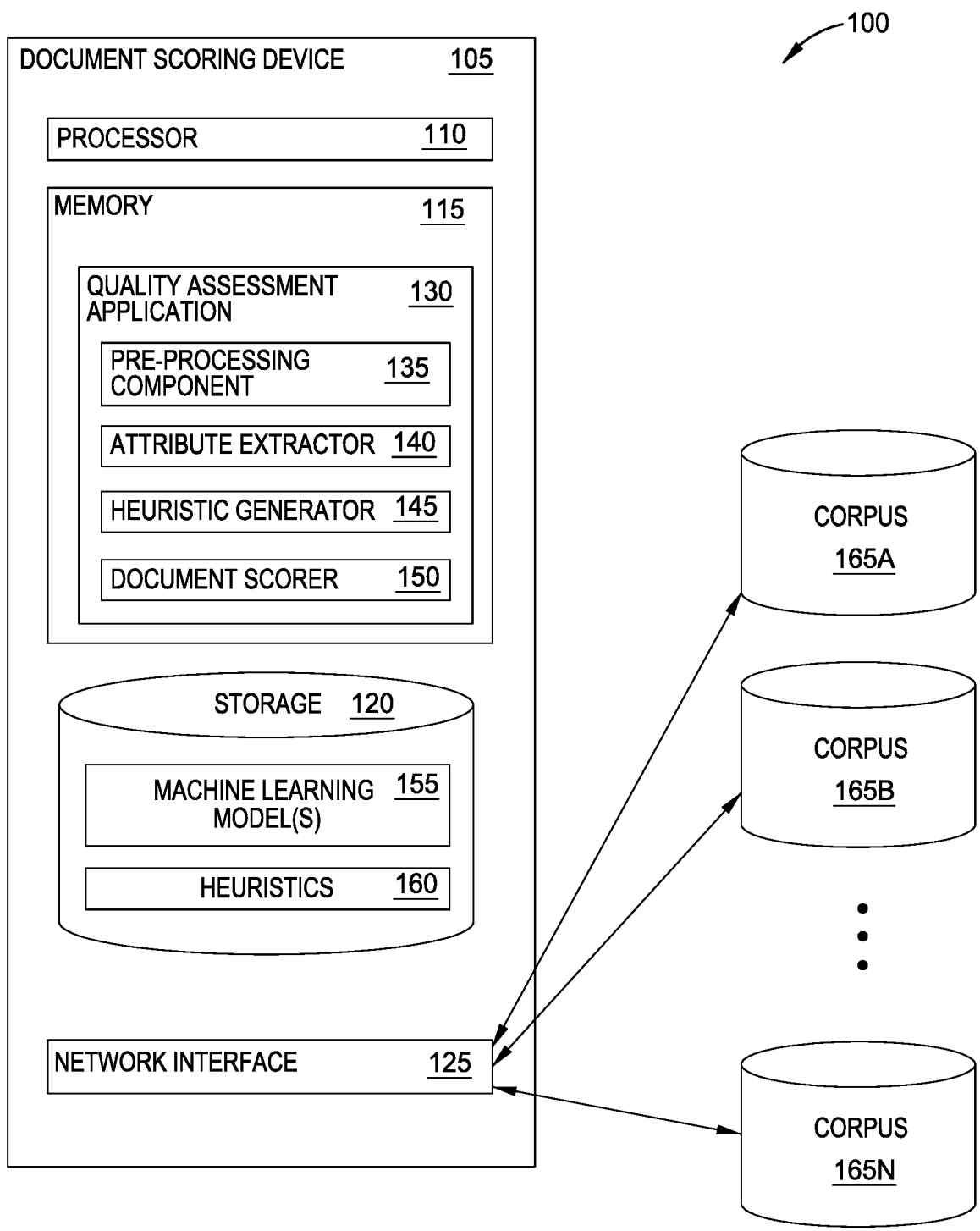
FIG. 1 is a block diagram illustrating a system for cognitive document quality determination, according to one embodiment disclosed herein.

Embodiments of the present disclosure provide techniques for automated heuristic generation and cognitive document quality determination that improve the integration of documents into machine learning systems. In existing systems, documents are manually curated to ensure they meet quality standards prior to their ingestion. However, this process is tedious and expensive, and is impractical or impossible for larger corpuses. Further, as different corpuses are utilized, the standards, procedures, and analysis used for a first corpus may be entirely ineffective for other corpuses. Moreover, this manual process is highly subjective and prone to error. For example, users can easily mistake high-quality documents for poor documents based on features or attributes that appear problematic, but that do not affect the cognitive ingestion. Similarly, it is easy to mistakenly classify a low-quality document as a high-quality document, because humans cannot readily understand the subtle factors that can cause difficulty in ingesting the document to a computer system.

Advantageously, embodiments of the present disclosure utilize concrete rules and machine learning models to provide objective quality determinations for documents to be ingested. This ensures that the resulting systems are efficient and accurate, and reduces the problems that can arise in systems that utilize manually-curated documents. Furthermore, embodiments of the present disclosure streamline and automate the ingestion process by processing the documents in differing manners, which allows for rapid integration of large corpuses. Similarly, embodiments of the present disclosure enable new corpuses to be analyzed to determine their usefulness based on the quality of the corresponding documents, which allows expectations to be set accordingly and informs decisions regarding the value of the corpus and the utility of processing it. In one embodiment, the approved documents are ingested into deep learning systems, such as Watson™, developed by International Business Machines Corporation® of Armonk, N.Y.

In some embodiments, documents are processed to determine a set of heuristics that can be used to predict the quality or suitability of a document for ingestion. In one embodiment, these heuristics are determined and used to train a machine learning (ML) model, and the same attributes can be used to subsequently process different documents from any number of corpora. In some embodiments, the models can be refined or retrained based on different attributes or heuristics, depending on the particular corpus or document being analyzed. For example, in one embodiment, one or more ML models can be trained for each type of corpus, and corpora with differing types of documents (e.g., formatted differently, prepared by different users or entities, intended for differing uses, and the like) can be analyzed with different ML models, based on different heuristics.

For example, in one embodiment, the system is used to ingest electronic medical record (EMR) data. In some embodiments, different ML models may be utilized to analyze documents corresponding to notes taken by a doctor or other healthcare provider, as opposed to clinical trial results. In some embodiments, the ML model(s) can be refined based on new attributes or heuristics. For example, in one embodiment, if a document is scored poorly but the document is known to be of high quality, the document can be analyzed to identify new attributes that are not considered by the current models, and the models can be updated to include these new attributes.

In one embodiment, a new ML model is generated for each client or customer. For example, in one embodiment, clients or customers may request ingestion or integration of their corpora. In such an embodiment, the relevant heuristics may vary based on the client or customer, because their particular methodologies in building and maintain the corpora can differ. Thus, in some embodiments, when a new client or customer requests integration, one or more new ML models can be generated based on the particular needs of the client, as discussed in more detail below. Once the ML model(s) are built, new unseen documents can be analyzed and scored, in order to determine whether the document is suitable for ingestion, or if additional processing is required. Additionally, in some embodiments, a subset of documents from a corpus can be analyzed, in order to determine whether a value or quality of the entire corpus (e.g., whether the entire corpus should be received, analyzed, and/or ingested).

FIG. 1 is a block diagram illustrating a system 100 for cognitive document quality determination, according to one embodiment disclosed herein. The system 100 includes a Document Scoring Device 105, and a number of Corpora 165A-N. In one embodiment, the Corpora 165A-N each include a set of documents to be ingested or integrated. Although illustrated as residing remotely from the Document Scoring Device 105, in embodiments, the documents may be stored in any suitable location, including locally by the Document Scoring Device 105, in a cloud storage location, on a client or customer server, on external drives or storage devices, and the like.

As illustrated, the Document Scoring Device 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Through the Network Interface 125, the Document Scoring Device 105 may be communicatively coupled with other devices, such as databases, other computing devices, and the like.

In the illustrated embodiment, the Storage 120 includes one or more ML Model(s) 155, and a set of Heuristics 160. In an embodiment, the ML Models 155 are trained using exemplars or documents from one or more Corpora 165, as discussed below in more detail. In some embodiments, the Heuristics 160 are attributes or features that have been previously identified as useful or important in determining the quality of a document. In one embodiment, the Heuristics 160 are used to train one or more ML Models 155, as discussed in more detail below. In one embodiment, the heuristics can include features such as the number of sentences in the document, the percentage of sentences that are complete (e.g., as opposed to incomplete sentences or unexpected sentence breaks), the average length of sentences in a document, the average number of blank spaces or lines between sentences, words, or tokens in the document, the number of sections or other structured document tags, the number of sentences in each section or structure, and the like. In an embodiment, a section" refers to defined headings or portions of the document that are logically discrete. For example, a first section may be titled "Background" while a second section is titled "Methodology" and a third is titled "Additional work."

As illustrated, the Memory 115 includes a conceptual illustration of a Quality Assessment Application 130, with a number of components. Specifically, in the illustrated embodiment, the Quality Assessment Application 130 includes a Pre-Processing Component 135, an Attribute Extractor 140, a Heuristic Generator 145, and a Document Scorer 150. Although depicted as discrete components for illustration, in embodiments, the operations and functionality of each component may be combined or divided across any number of components. Similarly, although illustrated as software components residing in memory, in embodiments, the operations or functionality of the components can be implemented using hardware, software, or a combination of hardware and software.

In an embodiment, the Pre-Processing Component 135 receives documents from the Corpora 165 and performs any pre-processing required, such as cleaning or formatting the documents. For example, in one embodiment, the Pre-Processing Component 135 removes markup, images or other files, and formats tables and graphs as plain text. In some embodiments, this processing is performed on the documents prior to the Document Scoring Device 105 receiving them. For example, in one embodiment, the documents are pre-processed by the owner or administrator of the Corpus 165 to which they belong. Further, in some embodiments, the documents do not undergo any pre-processing prior to being analyzed. In an embodiment, each document includes natural language text to be analyzed.

In the illustrated embodiment, the Attribute Extractor 140 receives documents and extracts attributes, characteristics, or features about the text of each document. For example, in an embodiment, the attributes can include the number of sentences in the document, the percentage of sentences that are complete (e.g., as opposed to incomplete sentences or unexpected sentence breaks), the average length of sentences in the document, the average number of blank spaces or lines between sentences, words, or tokens in the document, the number of sections or other structured document tags, the number of sentences in each section or structure, a number of unexpected or misplaced characters (e.g., characters or symbols from a different alphabet or language), a number of unmatched parenthesis or other symbols, and the like. In one embodiment, the Attribute Extractor 140 processes all of the documents that are to be analyzed using an ML Model 155.

In some embodiments, all of the documents in a given Corpus 165 are analyzed to determine their suitability for being processed using a defined target operation, such as using a natural language processing (NLP) algorithm. In one embodiment, each document is either processed using the target operation (e.g., ingested into a system) or is rejected, based on the quality or suitability score of the individual document. In some embodiments, each document is analyzed, and the entire Corpus 165 is accepted or rejected, based on the aggregate or average quality score of the Corpus 165. Additionally, in one embodiment, a subset of the documents in a Corpus 165 can be analyzed as a representative sample, and the quality of the overall Corpus 165 is determined or estimated based on the scores of the sample. In one embodiment, the Attribute Extractor 140 only extracts attributes corresponding to identified Heuristics 160 (e.g., as generated by the Heuristic Generator 145, discussed in more detail below).

In the illustrated embodiment, once the Attribute Extractor 140 has extracted the relevant attributes or features for each document, these attributes or features are analyzed by the Document Scorer 150 to generate a quality score for each document. In one embodiment, the Document Scorer 150 uses the attributes for a given document as inputs to one or more ML Models 155, where the output is the quality or suitability score for the given document. In some embodiments, the scores are provided to a user to help inform their decision regarding the value or quality of the Corpus 165, and how to proceed to ingest the data. In one embodiment, the Document Scorer 150 automatically rejects documents with a quality score below a threshold, and approves the documents with a score above a threshold. In such an embodiment, the approved documents can be used for further ingestion or processing (e.g., using one or more NLP models) into a computing system, such as a deep learning system.

In one embodiment, the rejected documents can be processed using a second operation (e.g., additional pre-processing or cleansing) in order to prepare them for use with the target operation (e.g., the NLP models). In some embodiments, the rejected documents are provided to a user (e.g., to the client or customer who manages the Corpus 165), such that they can be refined or improved. Additionally, in one embodiment, the user can approve the rejected document for ingestion or processing, despite the low score. In some embodiments, as discussed below in more detail, the rejected documents can be used to refine the ML Models 155 or train new models. For example, if a user or administrator believes one or more of the rejected documents are of high quality, or approved documents are of low quality, they can be used to refine the ML Models 155. Further, in an embodiment, the threshold(s) used by the Document Scorer 150 can be adjusted or refined, based on this determination.

Further, in one embodiment, the Attribute Extractor 140 is used in conjunction with the Heuristic Generator 145 to train or refine the ML Models 155. For example, in one embodiment, a set of high (or acceptable) quality documents and a set of low (or unacceptable) quality documents are provided for analysis. In an embodiment, the Attribute Extractor 140 analyzes each document in each set, and determines an average value for each of the attributes, with respect to each set. For example, in such an embodiment, the Attribute Extractor 140 can determine the average length of each sentence in each document in the high quality set, and then determine the overall average value for the acceptable set. Similar operations can be performed for the low quality set. In this way, the Attribute Extractor 140 can determine representative values, for each attribute, with respect to the defined sets.

In the illustrated embodiment, the Heuristics Generator 145 analyzes these representative values to identify features or heuristics that are useful to define the sets and classify documents as high or low quality. In one embodiment, the Heuristics Generator 145 determines whether the values for a particular feature differ between the high and low quality sets. If the difference exceeds a threshold, the Heuristics Generator 145 can determine that the feature is valuable, and add it to the list of Heuristics 160. For example, if the high and low quality documents tend to have sentences of significantly different lengths, the Heuristics Generator 145 can determine that the length of each sentence is a useful predictor, and include it in the Heuristics 160. In an embodiment, the ML Model(s) 155 can then be trained, using these Heuristics 160 as input. In this way, the ML Model(s) 155 are intelligently trained and cognitively refrain from using attributes or features that are not predictive or useful. This improves the accuracy and efficiency of both training and using the models.

Further, in an embodiment, the Heuristics Generator 145 and Attribute Extractor 140 can be used to refine the ML Models 155. For example, if a document is rejected by the Document Scorer 150 but is indicated (e.g., by a user or administrator) to be high quality, the ML Model(s) 155 may be refined based on this revised classification (e.g., the document can be used as an example of a "high quality" input). Further, in an embodiment, the Attribute Extractor 140 can process the document to identify features and characteristics that are not currently included in the Heuristics 160 that are used to analyze documents. If the value of one of these new attributes differs from the value of the same attribute with respect to low quality documents, the Heuristics Generator 145 can determine that this new attribute should be added as a new Heuristic 160 to aid future scoring. In such an embodiment, the ML Model 155 can be refined based on this new input (or a new ML Model 155 can be trained to use the additional input attribute for all documents).

Figure 2:
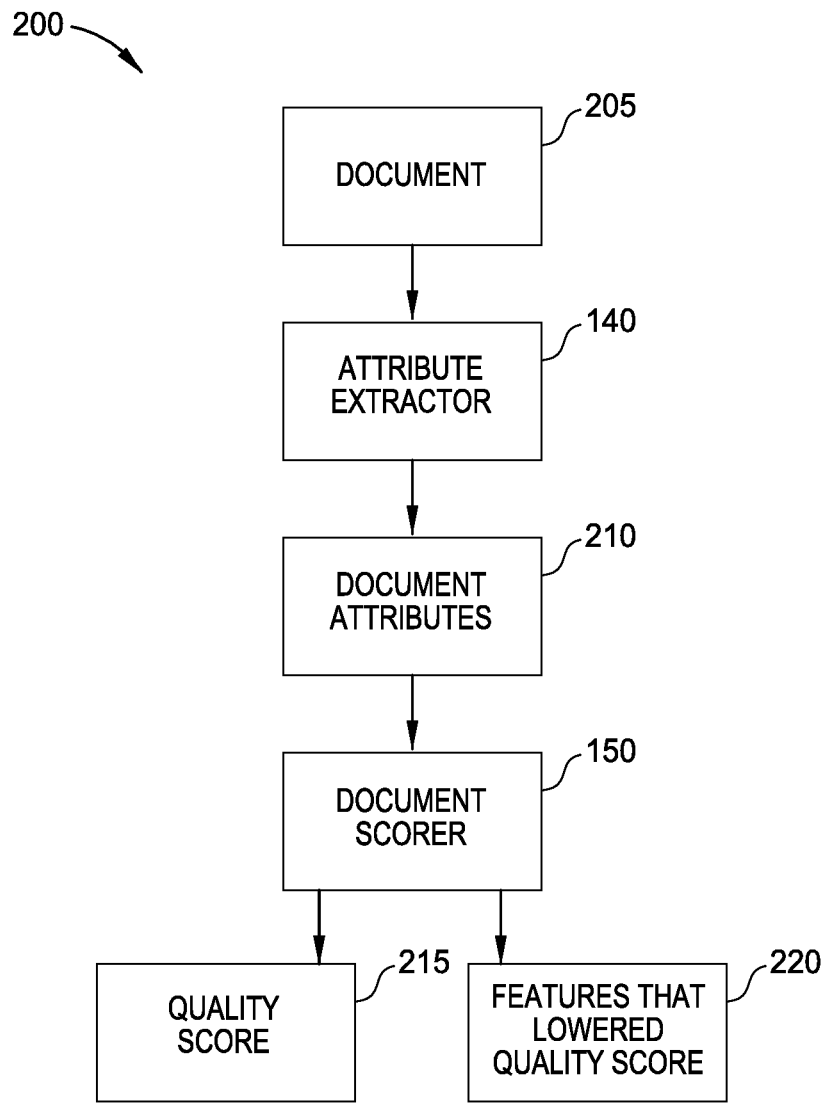
FIG. 2 illustrates a workflow for cognitive document quality determination, according to one embodiment disclosed herein.

FIG. 2 illustrates a workflow 200 for cognitive document quality determination, according to one embodiment disclosed herein. In the illustrated workflow 200, a Document 205 is parsed with an Attribute Extractor 140 to generate a plurality of Document Attributes 210. In an embodiment, the Document 205 includes natural language text. As discussed above, in embodiments, these attributes can include the number of sentences, the number of sections, the number of sentences per section, and the like. In some embodiments, the Document Attributes 210 includes a parse tree for the Document 205. In some embodiments, the Document Attributes 210 correspond to the identified Heuristics 160. That is, in an embodiment, the Attribute Extractor 140 only extracts features corresponding to the Heuristics 160. As illustrated, these Document Attributes 210 are then provided to the Document Scorer 150, which generates a Quality Score 215 for the Document 205.

In some embodiments, the Document Scorer 150 generates the Quality Score 215 by using the Document Attributes 210 as inputs to a ML Model 155. In one embodiment, the ML Model 155 is a neural network, where each neuron in the input layer corresponds to one of the Heuristics 160. In the illustrated embodiment, the Document Scorer 150 also identifies features that lowered the Quality Score 215, as indicated by block 220. That is, in some embodiments, the Document Scorer 150 can determine which of the Document Attributes 210 increased the Quality Score 215, and which decreased it.

In some embodiments, each of the Heuristics 160 is associated with an indication as to whether a higher value tends to correlate with a higher or lower Quality Score 215. For example, in an embodiment, if the Attribute Extractor 140 finds that a Document 205 has a single section (e.g., there are no internal delineations), this can be indicative of a low quality document (or low quality pre-processing). In contrast, more sections can indicate that the Document 205 has well-defined internal sections, which can indicate that the Document 205 is better-suited for ingestion or processing using the target operation. In some embodiments, these correlations are determined automatically (e.g., by processing a set of values, and increasing or decreasing one or more values to determine the effect on the Quality Score 215). In other embodiments, a user or administrator can define the correlations associated with each Heuristic 160.

In some embodiments, the features that lowered the Quality Score 215 are provided to a user or administrator (e.g., the entity who manages the Corpus 165). The user can then determine whether the Heuristics 160 may be a poor fit for the particular Corpus 165, whether additional Heuristics 160 would be helpful, or whether the Documents 205 in the Corpus 165 should be reformatted or revised, or are simply not worth ingesting. In one embodiment, the Document 205 can be modified based on the features. For example, in an embodiment, if the average number of sentences per section was too high (or the number of sections was too low), the Document 205 can be processed to attempt to identify headings or sub-headings. In one embodiment, the Pre-Processing Component 135 can use more or less sensitive techniques or settings to clean or parse the Document 205, or use different operations or techniques, in an attempt to improve the suitability of the Document 205 for ingestion. The Document 205 can then be analyzed again, to determine whether the Quality Score 215 has been increased.

Figure 3:
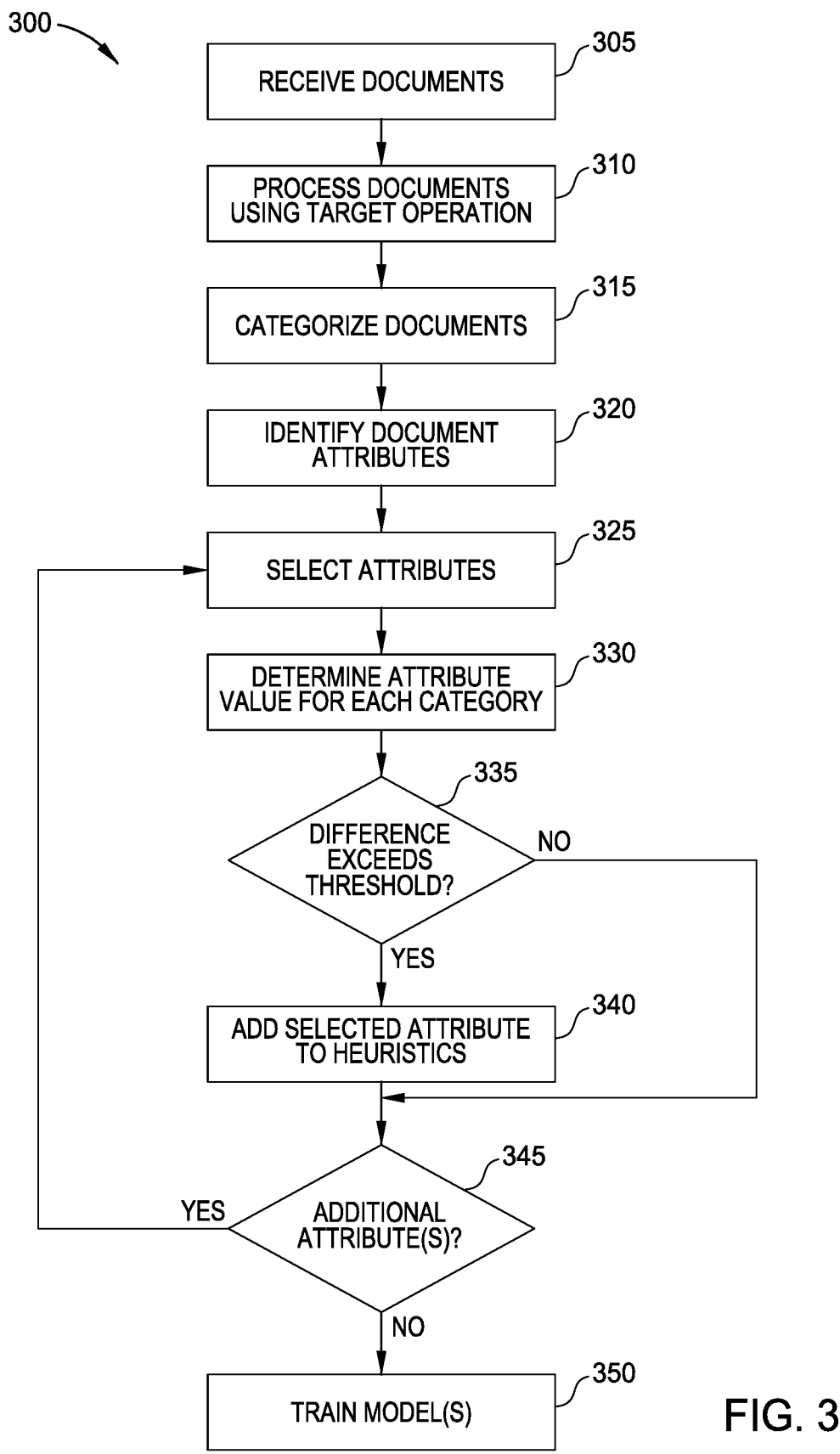
FIG. 3 is a flow diagram illustrating a method of generating heuristics and training a machine learning model for cognitive document quality determination, according to one embodiment disclosed herein.

FIG. 3 is a flow diagram illustrating a method 300 of generating heuristics and training a machine learning model for cognitive document quality determination, according to one embodiment disclosed herein. The method 300 begins at block 305, when a Quality Assessment Application 130 receives a set of documents (e.g., from a Corpus 165). In embodiments, this set of documents may correspond to the entire corpus, or a subset selected from the corpus. In one embodiment, the subset is selected using a random, quasi-random, or pseudo-random algorithm. At block 310, the Quality Assessment Application 130 processes the documents using a target operation. In embodiments, the target operation is the processing or operation that the user or administrator wishes to use to process or ingest the corpus. Thus, in embodiments, the quality score indicates the suitability of the document to be processed using the target operation, without additional pre-processing. For example, in one embodiment, the target operation corresponds to one or more NLP algorithms used to ingest documents into a deep learning model. In one embodiment, the target operation is completed by another device or application, rather than locally by the Quality Assessment Application 130.

The method 300 then proceeds to block 315, where the processed documents are categorized based on their quality. That is, in an embodiment, the documents are categorized or sorted based on the quality of the results achieved by the target operation. In one embodiment, this categorization is performed manually (e.g., by a user, administrator, or subject matter expert). For example, if the target operation is an NLP model, the user can determine, for each document, whether the resulting annotations and interpretation are accurate and useful. In this way, the Quality Assessment Application 130 can receive a set of documents that were successfully processed using the target operation (e.g., where the results were satisfactory or accurate), as well as a set of documents that were unsuccessfully processed. In one embodiment, the use of a random or pseudo-random subset of documents from the corpus can ensure that the ML model is accurate, without requiring manual review of the entire corpus.

In one embodiment, the documents (e.g., the results of the target operation) are categorized as acceptable or unacceptable. In some embodiments, the documents are classified into a multi-tier hierarchy, with high quality documents, low quality documents, and one or more categories for documents that are neither high nor low quality. For example, low quality documents may correspond to documents that cannot be readily converted to useful documents, high quality documents may correspond to documents that are immediately useable, and intermediate documents may correspond to documents that are not immediately useable, but that can be made usable with one or more defined operations. Such secondary operations can include, for example, removing stop words, reformatting the document, using different pre-processing, and the like. Additionally, in some embodiments, the documents are scored on a numeric scale, rather than classified into categories.

The method 300 then proceeds to block 320, where the Quality Assessment Application 130 (e.g., the Attribute Extractor 140) identifies attributes, features, or characteristics of each document. At block 325, the Quality Assessment Application 130 selects a first of these identified attributes. The method 300 continues to block 330, where the Quality Assessment Application 130 determines the value of the attribute, with respect to each of the defined categories of documents. For example, the Quality Assessment Application 130 can determine the average value of the selected attribute for the high quality documents, as well as the average value of the selected attribute with respect to the low quality documents. The method 300 then proceeds to block 335.

At block 335, the Quality Assessment Application 130 determines whether the difference between the aggregate attribute values exceeds a threshold. Stated differently, the Quality Assessment Application 130 determines whether the value of the selected attribute, with respect to a particular document, tends to differ based on the classification of the document (e.g., high or low quality). In one embodiment, this threshold is defined by a user or administrator. In some embodiments, the threshold can be adjusted dynamically to refine the ML models. For example, in one embodiment, if it is determined that the ML model's predictions are insufficient (e.g., too stringent or too lenient), the Quality Assessment Application 130 can analyze the attribute values of the exemplar categories using higher or lower difference thresholds, in order to adjust the list of Heuristics 160.

As illustrated, if the Quality Assessment Application 130 determines that the difference does not exceed the threshold, the method 300 proceeds to block 345. In contrast, if the Quality Assessment Application 130 determines that the difference exceeds the threshold, the method 300 continues to block 340, where the selected attribute is added to the list of relevant Heuristics 160. That is, because the attribute differs between high and low quality documents, the Quality Assessment Application 130 determines that it is likely useful or relevant in determining the quality of documents, and that future documents should be analyzed based in part on this attribute. In some embodiments, the Quality Assessment Application 130 also stores an indication as to whether a higher value indicates that it is a higher quality document, or a lower quality document. The method 300 then continues to block 345.

At block 345, the Quality Assessment Application 130 determines whether there is at least one additional attribute identified by the Attribute Extractor 140 that has not yet been processed. If so, the method 300 returns to block 325. Otherwise, the method 300 continues to block 350, where the Quality Assessment Application 130 trains one or more ML Models 155 based on the determined Heuristics 160. In one embodiment, training the ML Models 155 comprises iteratively providing the attribute or heuristic values associated with respective training documents as input, and the corresponding classification of the respective document as the target output. The weights of the ML Model 155 are refined based on the input and target output, to iteratively refine the model using each document. This process can then be repeated for each training document.

In one embodiment, each ML Model 155 is used to analyze a particular Corpus 165 (e.g., the Corpus 165 from which the training documents were selected). In some embodiments, one or more ML Models 155 can be used to process or analyze documents from multiple corpora, even if they were only trained on documents from a single Corpus 165. Further, in some embodiments, a single ML Model 155 can be trained based on documents gathered from multiple corpora. Once trained, the ML Models 155 can be used to classify or score new documents, in order to determine their suitability for ingestion or processing using the target operation.

Figure 4:
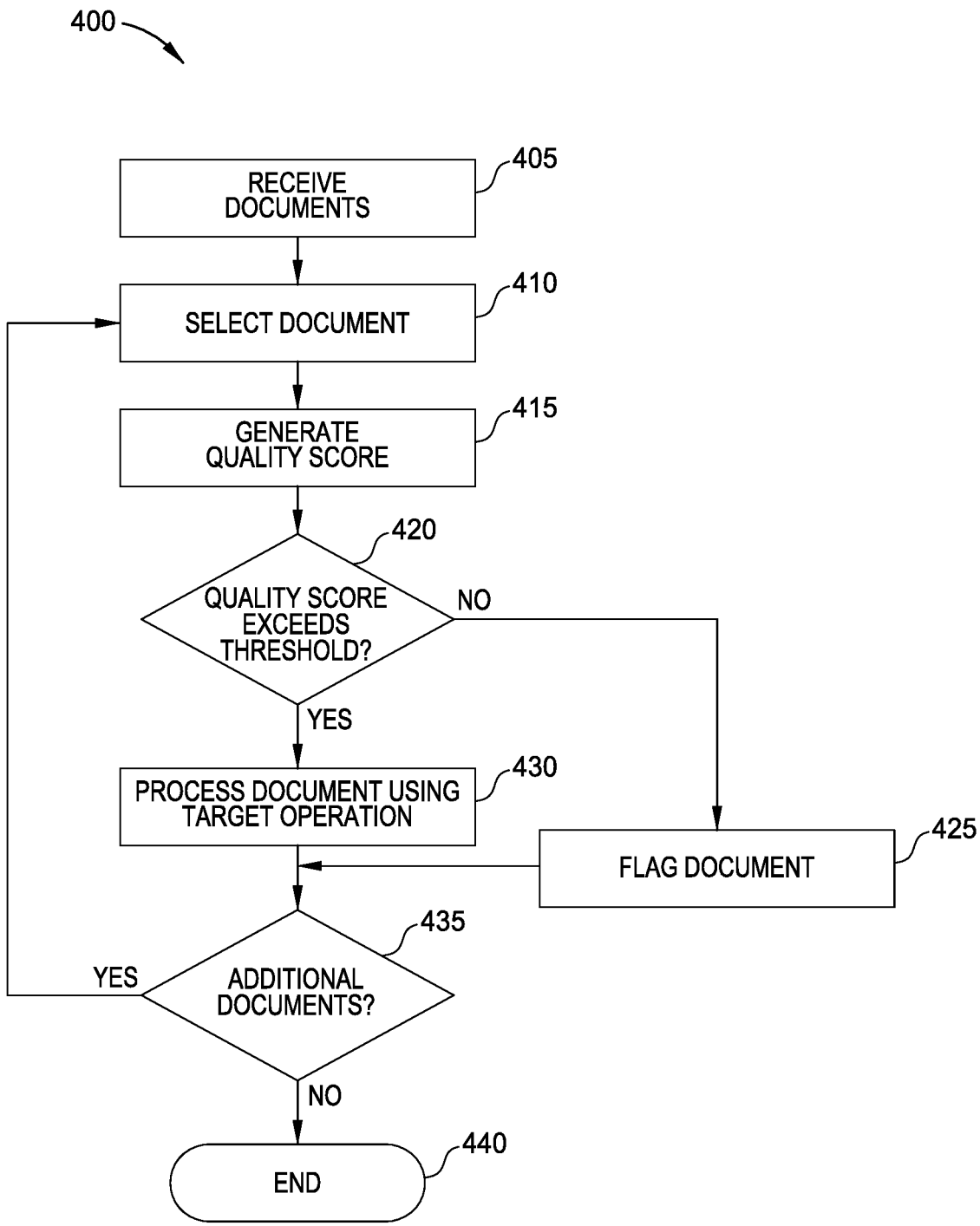
FIG. 4 is a flow diagram illustrating a method of ingesting documents based on cognitive quality scores, according to one embodiment disclosed herein.

FIG. 4 is a flow diagram illustrating a method 400 of ingesting documents based on cognitive quality scores, according to one embodiment disclosed herein. The method 400 begins at block 405, where the Quality Assessment Application 130 receives a set of documents. In an embodiment, these documents correspond to a Corpus 165 that the user, administrator, client, or customer wishes to process using the target operation. In some embodiments, every document in the Corpus 165 is processed using the method 400 (e.g., all documents are scored). In some embodiments, a subset or sample of the documents are scored, in order to determine whether the entire corpus should be ingested. The method 400 then proceeds to block 410, where the Quality Assessment Application 130 selects a first document in the received set.

At block 415, the Quality Assessment Application 130 generates a quality score for the selected document. In an embodiment, generating a quality score comprises identifying or extracting one or more attributes of the document, and analyzing those attributes using one or more ML models, as discussed above. The method 400 then proceeds to block 420, where the Quality Assessment Application 130 determines whether the generated quality score exceeds a threshold. In one embodiment, as discussed above, this threshold is set by a user or administrator. If the score does not exceed the threshold, the method 400 continues to block 425, where the Quality Assessment Application 130 flags the selected document. In one embodiment, flagging the document comprises generating or providing an indication of the document to a user or administrator.

As discussed above, in some embodiments, flagging the document also includes providing an indication as to which factors or attributes may have contributed to a low score for the document. In one embodiment, flagging the document comprises indicating that the document should be processed using at least one secondary operation or process, prior to use of the target operation. The method 400 then continues to block 435. Additionally, if, at block 420, the Quality Assessment Application 130 determines what the quality score exceeds the threshold value, the method 400 continues to block 430. At block 430, the Quality Assessment Application 130 processes the document using the target operation, or causes the document to be processed using the target operation. In some embodiments, the Quality Assessment Application 130 utilizes a hierarchy of thresholds. For example, in one embodiment, if the score exceeds a first threshold, the document can be marked as acceptable for immediate processing. If the score is below the first threshold but above a second, the document can be marked as potentially useful or acceptable, pending further processing. Additionally, in an embodiment, if the score is below the second threshold, the document can be rejected or flagged as unacceptable.

In some embodiments, the Quality Assessment Application 130 flags the document as suitable, or otherwise provides an indication that the document is ready for ingestion or processing using the target operation, or that the document should be pre-processed using one or more additional operations. In some embodiments, the actual ingestion or use of the target operation (or additional pre-processing) can occur on a remote device. The method 400 then continues to block 435. In one embodiment, if the document is subjected to additional pre-processing, the method 400 can be repeated once this processing is complete. In this way, it can be determined whether the additional operations improved the document, such that it is suitable for ingestion or processing using the target operation.

At block 435, the Quality Assessment Application 130 determines whether there is at least one additional document remaining to be analyzed. If so, the method 400 returns to block 410 to select the next document. In this way, the Quality Assessment Application 130 can iteratively analyze a set of documents to determine their suitability for ingestion using the target operation. In one embodiment, as discussed above, if a document is flagged as unsuitable, it can be processed using the method 400 at a subsequent time (e.g., after the secondary operation(s) is completed). In this way, the Quality Assessment Application 130 can determine whether the modified or updated document is now suitable for ingestion. If, at block 435, the Quality Assessment Application 130 determines that there are not additional documents for processing, the method 400 terminates at block 440.

Figure 5:
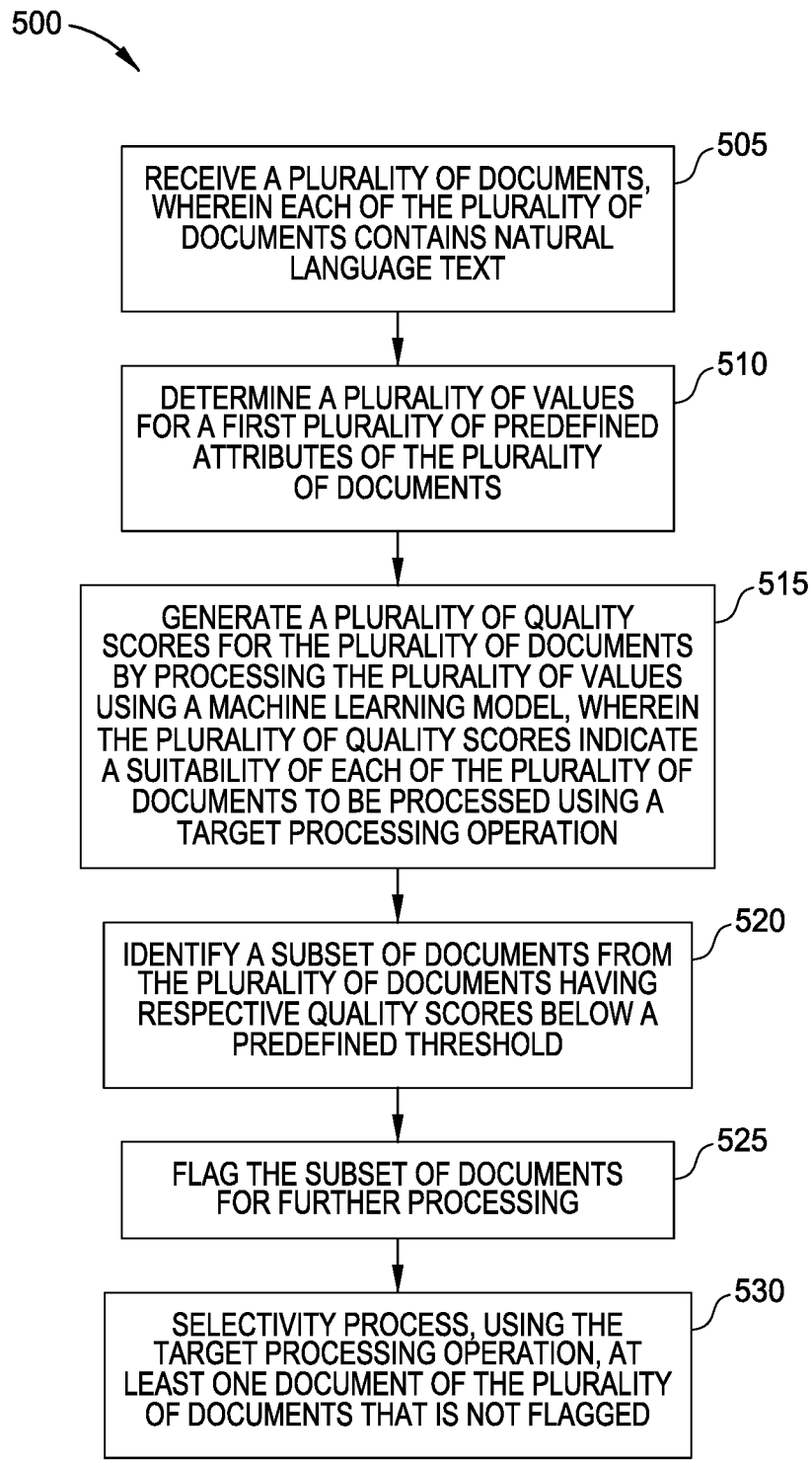
FIG. 5 is a flow diagram illustrating a method of generating cognitive quality scores for documents, according to one embodiment disclosed herein.

FIG. 5 is a flow diagram illustrating a method 500 of generating cognitive quality scores for documents, according to one embodiment disclosed herein. The method 500 begins at block 505, where the Quality Assessment Application 130 receives a plurality of documents, wherein each of the plurality of documents contains natural language text. The method 500 then proceeds to block 510, where the Quality Assessment Application 130 determines a plurality of values for a first plurality of predefined attributes of the plurality of documents. At block 515, the Quality Assessment Application 130 generates a plurality of quality scores for the plurality of documents by processing the plurality of values using a machine learning model, wherein the plurality of quality scores indicate a suitability of each of the plurality of documents to be processed using a target processing operation. The method 500 then continues to block 520, where the Quality Assessment Application 130 identifies a subset of documents from the plurality of documents having respective quality scores below a predefined threshold. At block 525, where the Quality Assessment Application 130 flags the subset of documents for further processing. Finally, the method 500 continues to block 530, where the Quality Assessment Application 130 selectively processes, using the target processing operation, at least one document of the plurality of documents that is not flagged.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Quality Assessment Application 130) or related data available in the cloud. For example, the Quality Assessment Application 130 could execute on a computing system in the cloud and analyze the suitability of input documents for processing using target operations. In such a case, the Quality Assessment Application 130 could analyze the documents using one or more ML models, and store the ML models and generated heuristics at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    determining that a first document is suitable for processing using a target processing operation;
    determining that a second document is not suitable for processing using the target processing operation;
    determining that a value of the new attribute with respect to the first document differs from a value of the new attribute with respect to the second document;
    training a machine learning model based at least in part on the new attribute;
    receiving a plurality of documents, wherein each of the plurality of documents contains natural language text;
    determining a plurality of values for a first plurality of attributes of the plurality of documents;
    generating a plurality of quality scores for the plurality of documents by processing the plurality of values using the machine learning model, wherein the plurality of quality scores indicate a suitability of each of the plurality of documents to be processed using the target processing operation;
    identifying a subset of documents from the plurality of documents having respective quality scores below a predefined threshold;
    flagging the subset of documents for further processing; and
    selectively processing, using the target processing operation, at least one document of the plurality of documents that is not flagged.

2. The method of claim 1, the method further comprising:
    determining an aggregate quality score based on the plurality of quality scores; and
    upon determining that the aggregate quality score is below a predefined threshold:

refraining from processing any of the plurality of documents using the target processing operation; and flagging the plurality of documents for further processing.

3. The method of claim 1, the method further comprising:

receiving approval of a first document in the subset of documents; and processing the first document using the target processing operation.

4. The method of claim 1, the method further comprising:

receiving a first set of documents that were each successfully processed using the target processing operation;

receiving a second set of documents that were each unsuccessfully processed using the target processing operation; and training the machine learning model based on the first and second sets of documents.

5. The method of claim 4, wherein the machine learning model was trained based at least in part on a second plurality of attributes associated with the first set of documents and a third plurality of attributes associated with the second set of documents.

6. The method of claim 1, wherein the target processing operation comprises a natural language processing (NLP) operation.

7. The method of claim 6, wherein the first plurality of attributes includes: (i) a number of sentences, (ii) a percentage of complete sentences, (iii) an average sentence length, (iv) a number of blank spaces between sentences, (v) a number of blank spaces between tokens, (vi) a number of structured document tags, and (vii) a number of sentences per section.

8. The method of claim 1, wherein the plurality of documents comprise electronic medical records (EMRs).

9. A computer program product comprising a computer-readable storage medium having computer-readable program code embodied therewith, the computer-readable program code executable by one or more computer processors to perform an operation comprising:

determining that a first document is suitable for processing using a target processing operation;

determining that a second document is not suitable for processing using the target processing operation;

determining that a value of the new attribute with respect to the first document differs from a value of the new attribute with respect to the second document;

training a machine learning model based at least in part on the new attribute;

receiving a plurality of documents, wherein each of the plurality of documents contains natural language text;

determining a plurality of values for a first plurality of attributes of the plurality of documents;

generating a plurality of quality scores for the plurality of documents by processing the plurality of values using the machine learning model, wherein the plurality of quality scores indicate a suitability of each of the plurality of documents to be processed using the target processing operation;

identifying a subset of documents from the plurality of documents having respective quality scores below a predefined threshold;

flagging the subset of documents for further processing; and selectively processing, using the target processing operation, at least one document of the plurality of documents that is not flagged.

10. The computer program product of claim 9, the operation further comprising:

determining an aggregate quality score based on the plurality of quality scores; and upon determining that the aggregate quality score is below a predefined threshold:

refraining from processing any of the plurality of documents using the target processing operation; and flagging the plurality of documents for further processing.

11. The computer program product of claim 9, the operation further comprising:

receiving approval of a first document in the subset of documents; and processing the first document using the target processing operation.

12. The computer program product of claim 9, the operation further comprising:

receiving a first set of documents that were each successfully processed using the target processing operation;

receiving a second set of documents that were each unsuccessfully processed using the target processing operation; and training the machine learning model based on the first and second sets of documents.

13. The computer program product of claim 12, wherein the machine learning model was trained based at least in part on a second plurality of attributes associated with the first set of documents and a third plurality of attributes associated with the second set of documents.

14. The computer program product of claim 9, wherein the first plurality of attributes includes: (i) a number of sentences, (ii) a percentage of complete sentences, (iii) an average sentence length, (iv) a number of blank spaces between sentences, (v) a number of blank spaces between tokens, (vi) a number of structured document tags, and (vii) a number of sentences per section.

15. A system comprising:

one or more computer processors; and a memory containing a program which when executed by the one or more computer processors performs an operation, the operation comprising:

determining that a first document is suitable for processing using a target processing operation;

determining that a second document is not suitable for processing using the target processing operation;

determining that a value of the new attribute with respect to the first document differs from a value of the new attribute with respect to the second document;

training a machine learning model based at least in part on the new attribute;

receiving a plurality of documents, wherein each of the plurality of documents contains natural language text;

determining a plurality of values for a first plurality of attributes of the plurality of documents;

generating a plurality of quality scores for the plurality of documents by processing the plurality of values using the machine learning model, wherein the plurality of quality scores indicate a suitability of each of the plurality of documents to be processed using the target processing operation;

identifying a subset of documents from the plurality of documents having respective quality scores below a predefined threshold;

flagging the subset of documents for further processing; and selectively processing, using the target processing operation, at least one document of the plurality of documents that is not flagged.

16. The system of claim 15, the operation further comprising:

determining an aggregate quality score based on the plurality of quality scores; and upon determining that the aggregate quality score is below a predefined threshold:

refraining from processing any of the plurality of documents using the target processing operation; and flagging the plurality of documents for further processing.

17. The system of claim 15, the operation further comprising:

receiving approval of a first document in the subset of documents; and processing the first document using the target processing operation.

18. The system of claim 15, the operation further comprising:

receiving a first set of documents that were each successfully processed using the target processing operation;

receiving a second set of documents that were each unsuccessfully processed using the target processing operation; and training the machine learning model based on the first and second sets of documents.

19. The system of claim 18, wherein the machine learning model was trained based at least in part on a second plurality of attributes associated with the first set of documents and a third plurality of attributes associated with the second set of documents.

20. The system of claim 15, wherein the first plurality of attributes includes: (i) a number of sentences, (ii) a percentage of complete sentences, (iii) an average sentence length, (iv) a number of blank spaces between sentences, (v) a number of blank spaces between tokens, (vi) a number of structured document tags, and (vii) a number of sentences per section.

* * * * *